(12) United States Patent
Feldhofer et al.

(10) Patent No.: US 11,409,973 B2
(45) Date of Patent: Aug. 9, 2022

(54) RFID DEVICE AND METHOD OF OPERATING AN RFID DEVICE

(71) Applicant: NXP B.V., Eindhoven (NL)

(72) Inventors: Martin Feldhofer, Weiz (AT); Franz Amtmann, Graz (AT); Peter Thüringer, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/168,246

(22) Filed: Feb. 5, 2021

(65) Prior Publication Data

US 2021/0271832 A1  Sep. 2, 2021

(30) Foreign Application Priority Data

Mar. 2, 2020 (EP) .................................. 20160501

(51) Int. Cl.
    *G06K 7/10* (2006.01)
    *G06K 19/07* (2006.01)

(52) U.S. Cl.
    CPC ..... *G06K 7/10297* (2013.01); *G06K 19/0723* (2013.01)

(58) Field of Classification Search
    CPC ........... G06K 19/0712; G06K 19/0723; G06K 19/0724; G06K 19/07767; G06K 7/10237; G06K 7/10297; G06K 19/0701; G06K 19/0709; G06K 7/10; H04B 5/0031; H04B 5/0037; H04B 5/0062; H04B 5/0068; H04W 4/80
    See application file for complete search history.

(56) References Cited

U.S. PATENT DOCUMENTS

| | | | |
|---|---|---|---|
| 7,525,413 B2* | 4/2009 | Jung | H04W 52/0225 340/10.33 |
| 10,515,360 B2 | 12/2019 | Chow | |
| 11,158,149 B2* | 10/2021 | Robertson | A61B 5/053 |
| 2002/0126013 A1* | 9/2002 | Bridgelall | G01S 11/02 340/572.1 |
| 2003/0104848 A1* | 6/2003 | Brideglall | G06K 7/0008 455/574 |

(Continued)

FOREIGN PATENT DOCUMENTS

| | | |
|---|---|---|
| EP | 3079104 A1 | 10/2016 |
| WO | 2011/159171 A2 | 12/2011 |

*Primary Examiner* — Brian E Miller (57) ABSTRACT

In accordance with a first aspect of the present disclosure, a radio frequency identification (RFID) device is provided, comprising a first power domain, a second power domain, a first processing unit, and a second processing unit, wherein the first processing unit is configured to execute one or more first operations and the second processing unit is configured to execute one or more second operations, wherein the first operations output intermediate data which are used as input for the second operations, and wherein the first processing unit is configured to operate in the first power domain and the second processing unit is configured to operate in the second power domain, said first power domain having a larger amount of available power than the second power domain. In accordance with further aspects of the present disclosure, a corresponding method of operating a radio frequency identification (RFID) device is conceived, and a corresponding computer program is provided.

15 Claims, 4 Drawing Sheets

(56) References Cited

U.S. PATENT DOCUMENTS

| | | | |
|---|---|---|---|
| 2004/0169080 A1 | 9/2004 | Azuma | |
| 2004/0169081 A1* | 9/2004 | Azuma | G06K 19/0707 235/451 |
| 2008/0081631 A1* | 4/2008 | Rofougaran | H01Q 1/38 455/452.1 |
| 2008/0290994 A1 | 11/2008 | Bruns et al. | |
| 2009/0085721 A1* | 4/2009 | Dishongh | H04Q 9/00 340/10.1 |
| 2009/0138718 A1 | 5/2009 | Chevallier-Mames | |
| 2014/0100978 A1* | 4/2014 | Forster | G06Q 20/32 705/21 |
| 2015/0317631 A1* | 11/2015 | Lesbirel | G06Q 20/40 705/44 |
| 2016/0156603 A1* | 6/2016 | Janik | H04L 63/0853 726/7 |
| 2018/0152050 A1* | 5/2018 | Ko | H02J 50/60 |
| 2018/0184698 A1* | 7/2018 | Arne | A23L 33/10 |
| 2019/0090131 A1* | 3/2019 | Smith | H04L 9/3215 |
| 2020/0275369 A1* | 8/2020 | Foster | G06F 1/3287 |

* cited by examiner

RFID DEVICE AND METHOD OF OPERATING AN RFID DEVICE

CROSS-REFERENCE TO RELATED APPLICATIONS

This application claims priority under 35 U.S.C. § 119 to European Patent Application No. 20160501.1, filed on Mar. 2, 2020, the contents of which are incorporated by reference herein.

TECHNICAL FIELD

The present disclosure relates to a radio frequency identification device. Furthermore, the present disclosure relates to a method of operating a radio frequency identification device, and to a computer program for carrying out said method.

BACKGROUND

Nowadays, radio frequency identification (RFID) devices are widely used, in different areas of industry and commerce and for various purposes. RFID devices may for example be embodied as so-called RFID tags or RFID cards. Furthermore, RFID devices may be configured to operate at different operating frequencies. For example, high frequency (HF) devices typically operate at a frequency ranging from 3 to 30 MHz (e.g., 13.56 MHz), while ultra-high frequency (UHF) devices typically operate at a frequency ranging from 300 MHz to 3 GHz (e.g., 2.45 GHz).

SUMMARY

In accordance with a first aspect of the present disclosure, a radio frequency identification (RFID) device is provided, comprising a first power domain, a second power domain, a first processing unit, and a second processing unit, wherein the first processing unit is configured to execute one or more first operations and the second processing unit is configured to execute one or more second operations, wherein the first operations output intermediate data which are used as input for the second operations, and wherein the first processing unit is configured to operate in the first power domain and the second processing unit is configured to operate in the second power domain, said first power domain having a larger amount of available power than the second power domain.

In one or more embodiments, the first operations have a higher complexity than the second operations.

In one or more embodiments, the first operations and the second operations are cryptographic operations, and the first operations output one or more precomputed values which are used as input for the second operations.

In one or more embodiments, the device further comprises a shared memory for storing the intermediate data.

In one or more embodiments, the device further comprises a high frequency (HF) communication unit, wherein the first power domain is a power domain of said HF communication unit.

In one or more embodiments, the HF communication unit is configured to operate at a frequency ranging from 3 to 30 MHz, in particular 13.56 MHz.

In one or more embodiments, the device further comprises an ultra-high frequency (UHF) communication unit, wherein the second power domain is a power domain of said UHF communication unit.

In one or more embodiments, the UHF communication unit is configured to operate at a frequency ranging from 300 MHz to 3 GHz, in particular 2.45 GHz.

In one or more embodiments, the first processing unit is implemented as a microcontroller and the second processing unit is implemented as a state machine.

In one or more embodiments, the device is an RFID tag or an RFID card.

In accordance with a second aspect of the present disclosure, a method of operating a radio frequency identification (RFID) device is conceived, wherein the RFID device comprises a first power domain, a second power domain, a first processing unit and a second processing unit, the method comprising: the first processing unit operates in the first power domain; the second processing unit operates in the second power domain, wherein said first power domain has a larger amount of available power than the second power domain; the first processing unit executes one or more first operations; the second processing unit executes one or more second operations; the first operations output intermediate data which are used as input for the second operations.

In one or more embodiments, the first operations have a higher complexity than the second operations.

In one or more embodiments, the first operations and the second operations are cryptographic operations, and the first operations output one or more precomputed values which are used as input for the second operations.

In one or more embodiments, the intermediate data are stored in a shared memory of the RFID device.

In accordance with a third aspect of the present disclosure, a computer program is provided, comprising executable instructions which, when executed by a first processing unit or a second processing unit, cause said first processing unit and second processing unit to carry out a method of the kind set forth.

DESCRIPTION OF DRAWINGS

Embodiments will be described in more detail with reference to the appended drawings, in which.

DESCRIPTION OF EMBODIMENTS

Nowadays, radio frequency identification (RFID) devices are widely used, in different areas of industry and commerce and for various purposes. RFID devices may for example be embodied as so-called RFID tags or RFID cards. Furthermore, RFID devices may be configured to operate at different operating frequencies. For example, high frequency (HF) devices typically operate at a frequency ranging from 3 to 30 MHz (e.g., 13.56 MHz), while ultra-high frequency (UHF) devices typically operate at a frequency ranging from 300 MHz to 3 GHz (e.g., 2.45 GHz).

In some applications, such as logistic applications, complex operations are performed by RFID devices. For example, an RFID tag may be attached to or embedded in a product that moves along a logistics chain. In such a case, the RFID tag may be used for authenticating the product. This authentication involves cryptographic operations, which may be complex and computationally intensive. For this reason, the authentication typically consumes a relatively large amount of power. However, such an RFID tag typically contains a long-range UHF communication unit, which has a limited amount of available power. Thus, there is a risk that not enough power is available for the authentication to succeed, or that the authentication takes too much time.

Now discussed are an RFID device and a corresponding method of operating an RFID device, which facilitate the execution of complex operations by RFID devices of the kind set forth.

Figure 1:
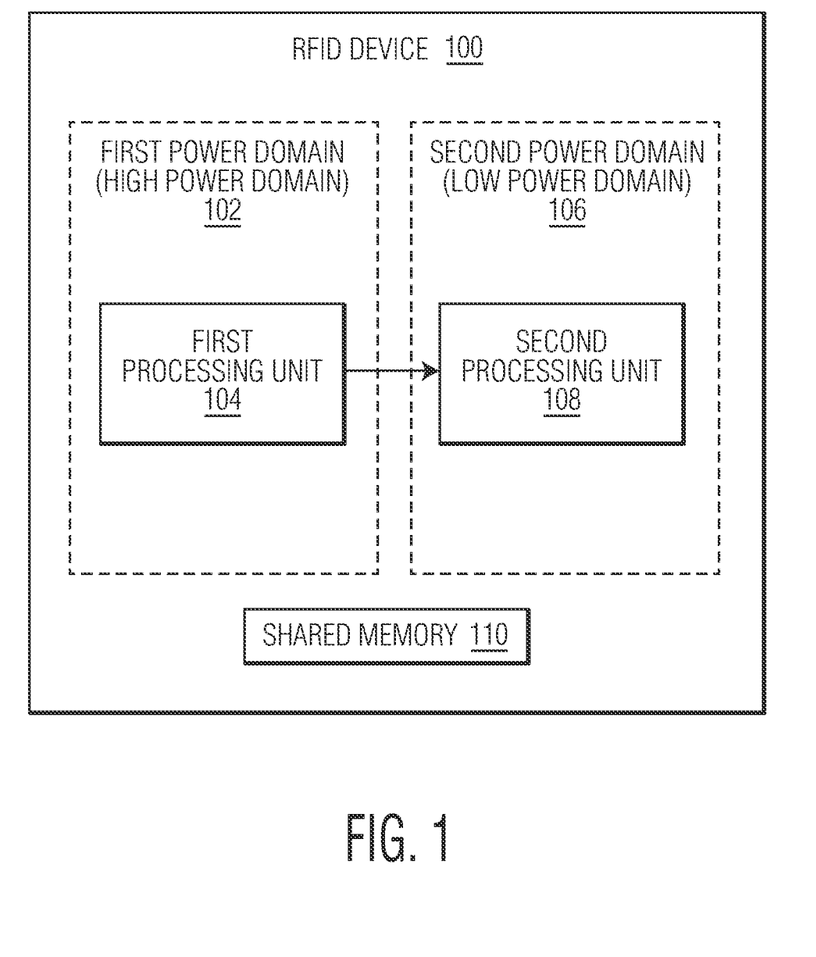
FIG. 1 shows an illustrative embodiment of an RFID device.

FIG. 1 shows an illustrative embodiment of an RFID device 100. The RFID device 100 comprises a first power domain 102, in particular a high power domain, and a second power domain 106, in particular a low power domain. Furthermore, the RFID device 100 comprises a first processing unit 104 and a second processing unit 108. The first processing unit 104 is configured to operate in the first power domain 102. It is noted that a power domain may refer to a domain within the RFID device, which includes a power source as well as components that are powered by said power source. For instance, an RFID device typically comprises a power harvesting unit, which is able to extract energy from a radio frequency (RF) field generated by an external RFID reader. In that case, the power harvesting unit is a power source, which together with the components that are powered by said harvesting unit may be referred to as a power domain. In the present example, therefore, the first processing unit 104 may be included in the first power domain 102, as a component of the RFID device 100 which is powered by a power harvesting unit (not shown) of the first power domain 102. Similarly, the second processing unit 108 is configured to operate in the second power domain 106. For instance, the second processing unit 108 may be included in the second power domain 106, as a component of the RFID device 100 which is powered by another power harvesting unit (not shown) of the second power domain 106.

Furthermore, the first processing unit 104 is configured to execute one or more first operations and the second processing unit 108 is configured to execute one or more second operations. Furthermore, the first operations output intermediate data which are used as input for the second operations. In particular, the first processing unit is configured to output the intermediate data, as a result of executing the first operations. In this way, a complex operation can be split into different parts that are executed in different power domains. More specifically, the complex operation may be treated as a compound operation that is split into a first operation, which is executed in a high-power domain, and a second operation, which is executed in a low power domain. Accordingly, the first operation may be an operation that consumes a relatively large amount of power compared to the second operation. Since the first operation is executed in a high-power domain, the risk that the compound operation does not succeed or that the compound operation takes too much time is reduced.

In one or more embodiments, the first operations have a higher complexity than the second operations. In this way, highly complex sub-operations can benefit from a higher amount of available power, which in turn increases the likelihood that a compound operation—i.e., an operation that comprises both the first operation and the second operation—succeeds. Furthermore, in one or more embodiments, the first operations and the second operations are cryptographic operations, and the first operations output one or more precomputed values which are used as input for the second operations. In this way, a complex cryptographic function can be properly executed by an RFID device of the kind set forth. In a practical implementation, the RFID device further comprises a shared memory 110 for storing the intermediate data. Accordingly, the shared memory may act as an interface between the first processing unit and the second processing unit.

In one or more embodiments, the RFID device further comprises a high frequency (HF) communication unit, and the first power domain is a power domain of said HF communication unit. In this way, the first power domain has a relatively large amount of available power. Typically, an HF communication unit is configured to operate at a frequency ranging from 3 to 30 MHz, in particular 13.56 MHz, and to communicate data over small distances. The HF communication unit may have a power harvesting unit (not shown) which is able to extract energy from a field generated by an external RFID reader. As an alternative to the HF communication unit, the RFID device may comprise a low frequency (LF) communication unit, which is configured to operate at a frequency ranging from 30 kHz to 299 kHz (e.g., 125 kHz or 134 kHz). Although such an LF communication unit has a relatively low data rate, the amount of available power is relatively high.

In one or more embodiments, the RFID device further comprises an ultra-high frequency (UHF) communication unit, and the second power domain is a power domain of the UHF communication unit. In this way, the communication range of the RFID device is increased—which enables for example logistic applications—while the RFID device can still execute relatively complex sub-operations in the first power domain. Typically, the UHF communication unit is configured to operate at a frequency ranging from 300 MHz to 1 GHz, and to communicate data over larger distances. The RFID device may conveniently be implemented as an RFID tag or an RFID card.

Figure 2:
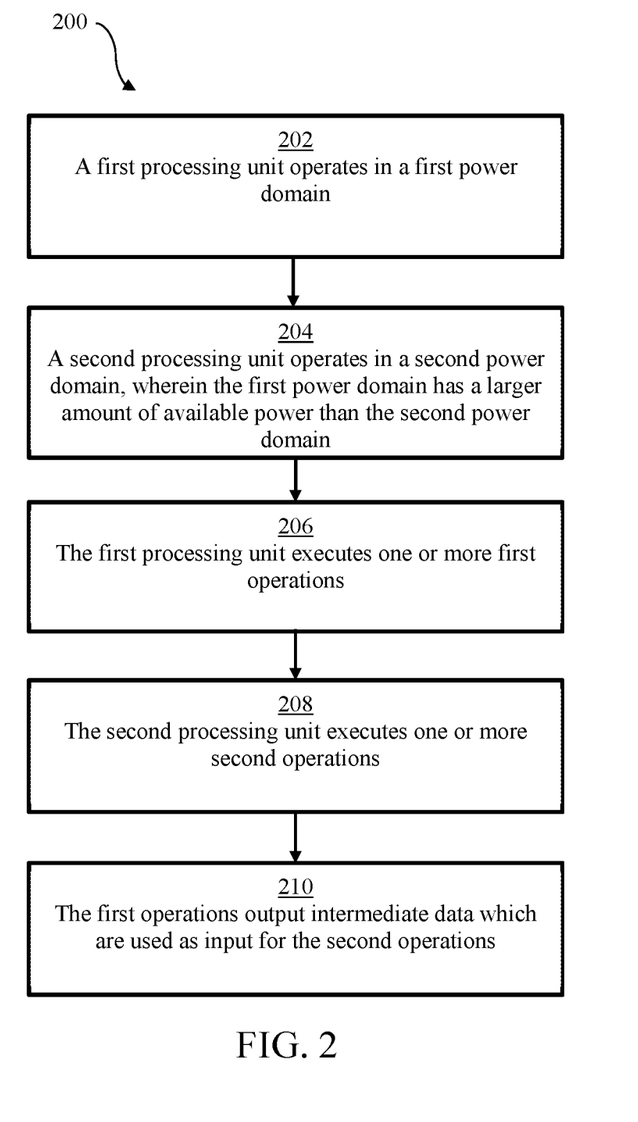
FIG. 2 shows an illustrative embodiment of a method of operating an RFID device.

FIG. 2 shows an illustrative embodiment of a method 200 of operating an RFID device. The method 200 comprises the following steps. At 202, a first processing unit operates in a first power domain. Furthermore, at 204, a second processing unit operates in a second power domain, wherein the first power domain has a larger amount of available power than the second power domain. At 206, the first processing unit executes one or more first operations, and at 208, the second processing unit executes one or more second operations. Furthermore, at 210, the first operations output intermediate data which are used as input for the second operations. As explained above, since the first operation is executed in a high-power domain, the risk that a compound operation does not succeed or that the compound operation takes too much time is reduced. The method 200 may at least partially be implemented as a computer program. Furthermore, the method may partially or entirely be implemented in hardware. More specifically, both processing units, which execute the operations, may be implemented as a microcontroller or as a state machine. Furthermore, a combination of different types of hardware may be envisaged. In a particularly useful embodiment, the first processing unit is implemented as a microcontroller, while the second processing unit is implemented as a state machine. The state machine consumes less power than the microcontroller, but is still capable of executing less complex operations. Therefore, the state machine is a suitable processing unit for the low power domain.

Figure 3:
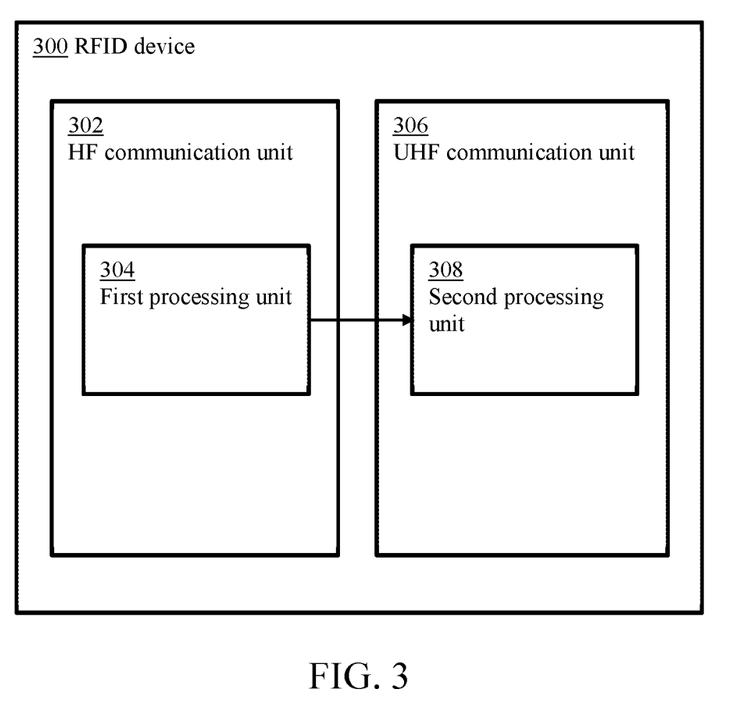
FIG. 3 shows another illustrative embodiment of an RFID device.

FIG. 3 shows another illustrative embodiment of an RFID device 300. The RFID device 300 includes a high frequency (HF) communication unit 302 and an ultra-high frequency (UHF) communication unit 306. The HF communication unit 302 comprises the first processing unit 304, and the UHF communication unit 306 comprises the second processing unit 308. This embodiment results in a practical implementation of the different power domains. An HF communication unit 302 typically has a power harvesting unit as well as components powered by said power harvesting unit. Similarly, a UHF communication unit 306 typically has a power harvesting unit as well as components powered by said power harvesting unit. Thus, the HF communication unit 302 and the UHF communication unit 306 effectively implement different power domains. Furthermore, an HF communication unit 302 typically has a large amount of available power compared to a UHF communication unit 306. In other words, the power domain implemented by the HF communication unit 302 may be regarded as a high-power domain.

Thus, in accordance with the present disclosure, a mechanism may be conceived by means of which a complex computation (e.g., a cryptographic authentication function) is separated in a combined HF-UHF RFID tag, in such a way that a computationally intensive operation is performed in the HF field, i.e. when the tag is within range of an HF reader, while a less computationally intensive operation is performed in the UHF field, i.e. when the tag is within range of a UHF reader. The first operation may include a precomputation, which results in an intermediate output value that is used by the second operation (e.g., a finalization operation).

Figure 4:
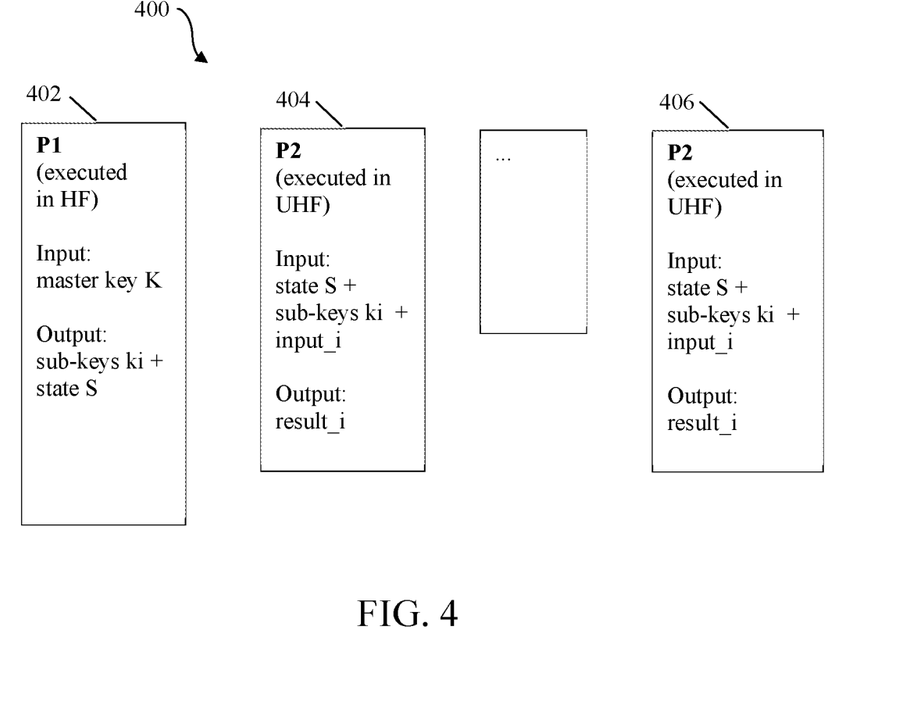
FIG. 4 shows illustrative embodiments of a first operation and a second operation.

FIG. 4 shows illustrative embodiments of a first operation and a second operation. In this embodiment, a pseudo-random function is split into two phases. The first phase corresponds to a first operation 402, which is executed in a high-power HF domain, and the second phase corresponds to a second operation 404, 406, which is executed in a low power UHF domain. The main property is that the P1 function—i.e., the first operation 402—has a significantly larger width (i.e., internal state size). In the first phase, the main secret key K is input and undergoes a key derivation. The output of P1 is then a state S and a derived key ki which is stored and used as input for the construction P2. This so-called sub-key or derived key ki can then be used for a reasonable number of authentications (e.g., $2^{10}$). The internal state of P2 is significantly smaller than the internal state of P1, which results in a less complex implementation and a lower power consumption. The actual input_i (which is a random number as part of a challenge response authentication) is also input to the P2 function. The skilled person may determine which exact values have to be stored between P1 and P2, where the secret key is used, how large the internal states are, where the real input_i is applied and in which instances of P2. Furthermore, the skilled person will appreciate that the operations shown in FIG. 4 are merely examples of operations that can be implemented in accordance with the present disclosure, and that other types of operations—including operations which do not involve cryptographic operations—are covered as well by the appended claims.

The intrinsic property of a combined HF-UHF tag is that, when operated in the HF field, the operation range is limited (typically less than 10 centimeters or less than 1 meter), but the amount of available power is high, while in the UHF field the operation range is significantly extended (i.e., typically up to 15 meters), but the amount of available power is very limited. In certain applications, such as security applications, strong computationally intensive cryptographic algorithms are used. Since these algorithms need sufficient computation time, the power consumption may be high. Note that, in a hardware implementation, there is typically a trade-off between power consumption (clock frequency) and computation time. Furthermore, a property of combined HF-UHF tags is that they are most of the time used in a long-range UHF field and only rarely used in an HF field. As a result, long-range UHF applications may have limited cryptographic functionality. In accordance with the present disclosure, the cryptographic functionality may be extended by separating a complex cryptographic function in different parts. In particular, a computationally intensive operation of said function—which may only have to be performed a limited number of times—can be executed in the HF field, while a computationally efficient operation of said function—which may have to be executed more often—can be executed in the UHF field.

In particular, a computationally intensive operation may be separated into a first, rarely executed and highly complex operation which is performed in the HF field. The result of this precomputation may be stored in a shared memory, and be used multiple times by a second, computationally efficient operation. More specifically, the latter operation may be executed frequently, because it can be implemented very efficiently with low complexity and low power in the UHF field. For example, the highly complex operation can be performed on a dedicated HF reader terminal, for example during production of the device or when the device enters a specific location or a specific life cycle. In contrast, the efficient operation can be performed at any time, for example during transport, when entering a new location, or each time when a tagged item is used.

It is noted that the presently disclosed RFID device may be implemented as a combined HF-UHF RFID tag integrated circuit (IC). In that case, the HF part of the IC may be realized in a similar way as a smartcard controller. Furthermore, the UHF part of the IC may be realized as a UHF RFID tag with an extended digital part. The interface between the HF and the UHF tag may be a commonly used memory area that allows storing the precomputed data from the HF side and reading said precomputed data out when the UHF part is active. Alternatively, or in addition, the HF part and/or the UHF part can have separated memory blocks which have different power requirements and or speed requirements.

The presently disclosed RFID device may be used, for example, in logistic applications in which a combined HF-UHF RFID tag is used for authenticating a product that moves along the logistics chain. In particular, at the origin of the product the HF precomputation may be performed, potentially also at certain stages on the way to the destination. The latter may be done by an end user who has a mobile phone with near field communication (NFC) functionality. Along the complete logistics chain, the actual authentication of the product is performed with a UHF long-range reader, which for example verifies the proof of origin while the product enters a UHF transit gate or while the product is stored in a box on a pallet.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, a state machine, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 RFID device
102 first power domain (high power domain)
104 first processing unit
106 second power domain (low power domain)
108 second processing unit
200 method of operating an RFID device
202 a first processing unit operates in a first power domain
204 a second processing unit operates in a second power domain, wherein the first power domain has a larger amount of available power than the second power domain
206 the first processing unit executes one or more first operations
208 the second processing unit executes one or more second operations
210 the first operations output intermediate data which are used as input for the second operations
300 RFID device
302 HF communication unit
304 first processing unit
306 UHF communication unit
308 second processing unit
400 first operation and second operation
402 first operation
404 second operation
406 second operation

The invention claimed is:

1. A radio frequency identification, RFID, device, comprising:
a first power domain, further comprising a high frequency, HF, communication unit, wherein the first power domain is a power domain of said HF communication unit, wherein the HF communication unit is configured to operate at a frequency ranging from 3 to 30 MHz;
a second power domain, further comprising an ultra-high frequency, UHF, communication unit, wherein the second power domain is a power domain of said UHF communication unit, wherein the UHF communication unit is configured to operate at a frequency ranging from 300 MHz to 3 GHz;

a first processing unit in the first power domain, wherein the first processing unit is implemented as a microcontroller;

a second processing unit in the second power domain, wherein the second processing unit is implemented as a state machine;

wherein the microcontroller is configured to execute one or more first operations and the state machine is configured to execute one or more second operations;

wherein the one or more first operations output intermediate data which are communicated within the RFID device from the microcontroller to the state machine and used as input for the one or more second operations; and wherein the first processing unit is configured to operate in the first power domain and the second processing unit is configured to operate in the second power domain, said first power domain having a larger amount of available power than the second power domain;

wherein the one or more first operations and the one or more second operations are cryptographic operations, and wherein the one or more first operations output one or more precomputed values which are used as input for the one or more second operations;

wherein the one or more first operations comprise key derivation, the one or more precomputed values comprises a derived key, and the one or more second operations comprise one or more authentications.

2. The device of claim 1, wherein the first operations have a higher complexity relative to the second operations.

3. The device of claim 1, further comprising a shared memory for storing the intermediate data.

4. The device of claim 1, wherein the HF communication unit is configured to operate at a frequency of 13.56 MHz.

5. The device of claim 1, wherein the UHF communication unit is configured to operate at a frequency of 2.45 GHz.

6. The device of claim 1, being an RFID tag or an RFID card.

7. A method of operating a radio frequency identification, RFID, device, wherein the RFID device comprises a first power domain, a second power domain, a first processing unit and a second processing unit, the method comprising:

the first processing unit operates in the first power domain, wherein the first processing unit is implemented as a microcontroller;

the second processing unit operates in the second power domain, wherein the second processing unit is implemented as a state machine, and wherein said first power domain has a larger amount of available power than the second power domain;

wherein the RFID device further comprises a high frequency, HF, communication unit, and wherein the first power domain is a power domain of said HF communication unit, wherein the HF communication unit operates at a frequency ranging from 3 to 30 MHz;

wherein the RFID device further comprises an ultra-high frequency, UHF, communication unit, and wherein the second power domain is a power domain of said UHF communication unit, wherein the UHF communication unit operates at a frequency ranging from 300 MHz to 3 GHz;

the first processing unit executes one or more first operations;

the second processing unit executes one or more second operations;

the one or more first operations output intermediate data which are communicated within the RFID device from the microcontroller to the state machine and used as input for the one or more second operations;

wherein the one or more first operations and the one or more second operations are cryptographic operations, and wherein the one or more first operations output one or more precomputed values which are used as input for the one or more second operations;

wherein the one or more first operations comprise key derivation, the one or more precomputed values comprises a derived key, and the one or more second operations comprise one or more authentications.

8. The method of claim 7, wherein the first operations have a higher complexity relative to the second operations.

9. The method of claim 7, wherein the intermediate data are stored in a shared memory of the RFID device.

10. The method of claim 7, wherein the HF communication unit operates at a frequency of 13.56 MHz.

11. The method of claim 7, wherein the UHF communication unit operates at a frequency of 2.45 GHz.

12. The method of claim 7, wherein the method is implemented as a computer program comprising executable instructions stored in a non-transitory computer-readable medium, which when executed by the first processing unit and the second processing unit, cause the first processing unit and second processing unit to carry out the method.

13. A radio frequency identification, RFID, device, comprising:

a high frequency, HF, communication unit, wherein the HF communication unit is configured to operate at a frequency ranging from 3 to 30 MHz, in particular 13.56 MHz;

an ultra-high frequency, UHF, communication unit, wherein the UHF communication unit, wherein the UHF communication unit is configured to operate at a frequency ranging from 300 MHz to 3 GHz, in particular 2.45 GHz;

wherein the HF communication unit includes a first processing unit;

wherein the UHF communication unit includes a second processing unit;

wherein the first processing unit is configured to execute one or more first operations and the second processing unit is configured to execute one or more second operations;

wherein the one or more first operations output intermediate data which are communicated within the RFID device from the first processing unit to the second processing unit and used as input for the one or more second operations; and wherein the first processing unit is configured to operate in a first power domain and the second processing unit is configured to operate in a second power domain, the first power domain having a larger amount of available power than the second power domain;

wherein the one or more first operations and the one or more second operations are cryptographic operations, and wherein the one or more first operations output one or more precomputed values which are used as input for the one or more second operations.

14. The device of claim 13, wherein the first processing unit is implemented as a microcontroller and the second processing unit is implemented as a state machine.

15. The device of claim 13, further comprising a shared memory for storing the intermediate data.

* * * * *